United States Patent [19]

Shenk et al.

[11] 4,017,873
[45] Apr. 12, 1977

[54] EXPOSURE CONTROL SYSTEM WITH BRAKING CAPABILITY

[75] Inventors: Edwin K. Shenk, Westford; Jüerg Muggli, Woburn, both of Mass.

[73] Assignee: Polaroid Corporation, Cambridge, Mass.

[22] Filed: Oct. 3, 1975

[21] Appl. No.: 619,385

[52] U.S. Cl. .............................. 354/29; 354/30; 354/27; 354/60 R; 354/230
[51] Int. Cl.$^2$ ..................................... G03B 7/14
[58] Field of Search ............... 354/29, 30, 26, 27, 354/60 R, 59, 230

[56] References Cited

UNITED STATES PATENTS

| | | | |
|---|---|---|---|
| 3,750,543 | 8/1973 | Eloranta et al. | 354/29 X |
| 3,927,415 | 12/1975 | Petersen | 354/30 X |
| 3,942,183 | 3/1976 | Whiteside | 354/29 |
| 3,952,312 | 4/1976 | Douglas | 354/30 X |

*Primary Examiner*—L. T. Hix
*Assistant Examiner*—Vit W. Miska
*Attorney, Agent, or Firm*—Edward S. Roman

[57] ABSTRACT

This invention relates to a photographic apparatus which includes an exposure control system having shutter blade elements with respective selectively shaped aperture openings therethrough which, depending upon the position of the blades, symmetrically overlap over a light entering exposure opening within the camera to define an effective scene light admitting aperture. During an exposure interval, the blades move simultaneously in correspondence with each other to define a progressively variable effective aperture opening over the camera light entering opening. The exposure control system additionally includes exposure control circuitry having a photoresponsive element therein as well as means responsive to the output condition of the photoresponsive element for arresting the shutter blade movement to define a maximum effective size aperture opening as a function of a first select scene light condition during a photographic exposure interval. Means are also provided for thereafter initiating the closure of the shutter blade elements to terminate the exposure interval as a function of a second select scene light condition.

22 Claims, 13 Drawing Figures

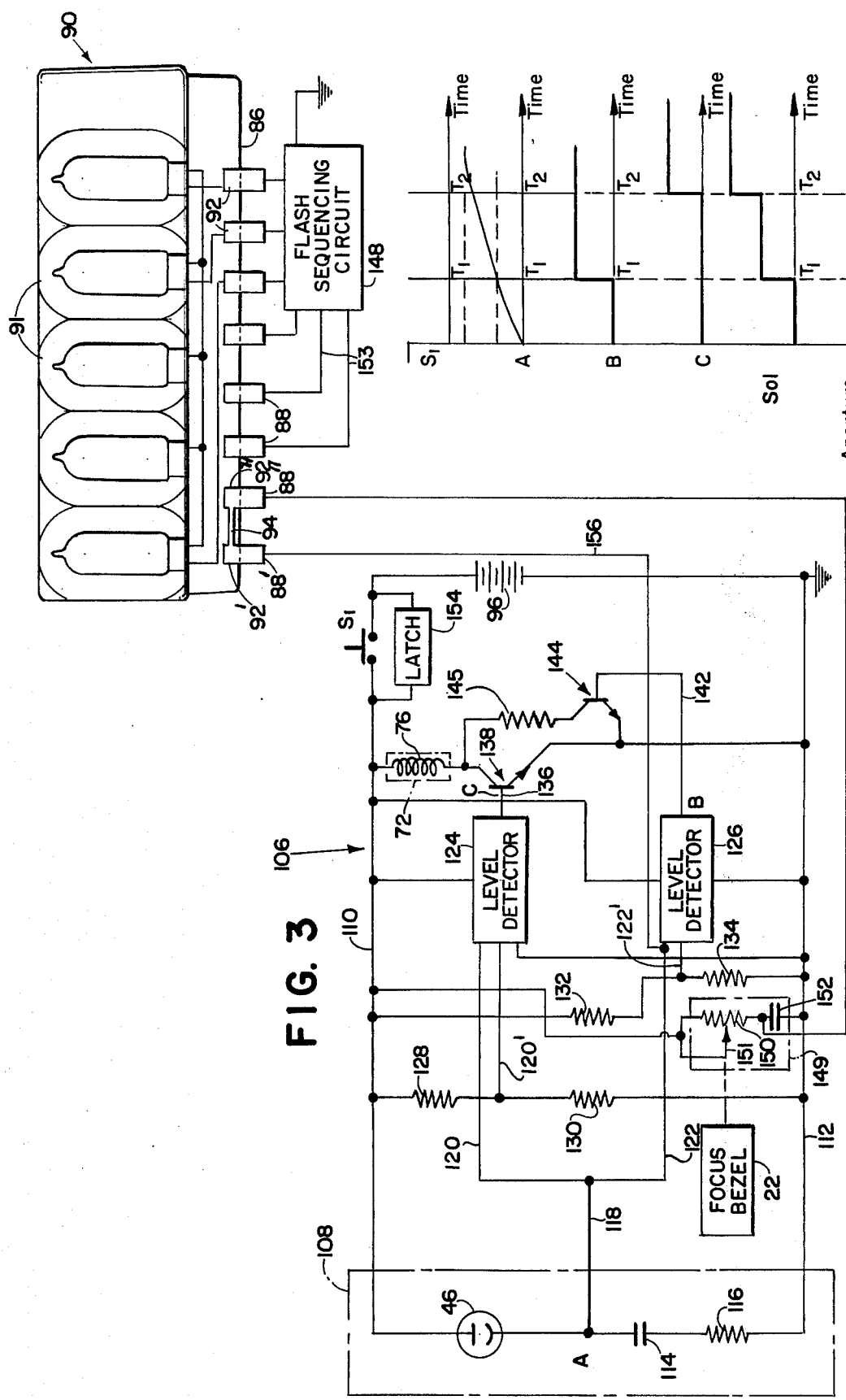

EXPOSURE CONTROL SYSTEM WITH BRAKING CAPABILITY

BACKGROUND OF THE INVENTION

1. Field of the Invention

This invention relates generally to an exposure control system having scene light responsive means for automatically selecting maximum effective aperture and exposure control system for the with "scanning type" shutter blade elements wherein the exposure control system includes means responsive to scene light for arresting the shutter blade movement and determining a maximum effective aperture size as a function of a first select scene light condition, as well as means for initiating the closing of the shutter blade elements and terminating the exposure interval as a function of a second scene light condition.

2. Description of the Prior Art

Automatic light responsive exposure control systems are well known in the photographic arts and have been long used to control the duration of photographic exposure intervals. Such systems may also be used in conjunction with an aperture defining mechanism so as to halt the mechanism at a position appropriate for operation under a desired exposure program prior to the actual exposure interval as is more fully described in a U.S. Pat. No. 3,641,891 entitled "Exposure Control System" by John Burgarella issued Feb. 15, 1972 and assigned in common herewith. The exposure control system of Burgarella provides for automatic sequential regulation, first of exposure aperture, and then of exposure interval. Voltage sensitive triggering circuits coupled to receive the output of a light sensitive circuit are used for controlling first the aperture mechanism, and then the shutter mechanism to provide a predetermined exposure program. Such an exposure control system may also be made sensitive to both ambient illumination and illumination derived artificially, thereby being useable in a "fill-in" flash function.

Exposure control systems have also incorporated what is termed a "follow-focus" system where the aperture adjusting mechanism is mechanically coupled with the focusing system of the camera. Thus, as the lens focus system is moved to provide the correct focus for a particular distance from the camera to the subject, the coupling mechanism of the follow-focus control system also moves to provide an appropriate exposure aperture opening in response to the focusing action thereby setting the exposure aperture in accordance with the anticipated light level at the scene to the photographed. Because of the known characteristics of the flashlamp being used, the anticipated light level at the scene to be photographed is functionally related to the distance to the subject. The automatic exposure control system which is responsive to both scene light by way of an exposure control circuit and to subject distance by way of a follow-focus setting is described in U.S. Pat. No. 3,464,332 issued to Davidson et al on Sept. 2, 1969. In the exposure control system of this patent, the aperture opening for admitting light to the film plane is automatically selected in accordance with the focusing of the camera and the exposure time is then controlled by a light detecting and integrating circuit so as to establish a unique interrelationship between the exposure aperture and exposure time.

Another exposure control system, as fully described in U.S. Pat. No. 3,522,763 entitled "Exposure Control Apparatus" by Milton Dietz, issued Aug. 4, 1970 and assigned in common herewith, automatically regulates the exposure interval when used in the flashmode of operation in accordance with either of two functions, the one being the level of illumination of the subject as photoelectrically sensed, and the other being the distance between the subject and the source of illumination. Thus the shutter automatically responds to both functions terminating exposure in accordance with one or the other, whichever is first to control the shutter. That portion of the exposure control circuit utilized to control the shutter as a function of the distance between the subject and the source of illumination embodies a timing circuit comprising a capacitor and variable shutter resistor in cooperative association with the focusing means so that focus adjustment for subjects as a relatively great distance from the camera provides for a relatively high resistance, whereas focus adjustment for a subject relatively close to the camera position provides a relatively low resistance. Such a system is somewhat analogous to the above-described "follow-focus" system in that exposure interval is electronically controlled as a function of camera to subject distance, whereas in the "follow focus" system aperture size is mechanically controlled as a function of camera to subject distance. Not only may exposure interval be electronically controlled in the above-described manner by means of a variable resistor in cooperative association with the focusing means, but also exposure aperture may be automatically determined as a function of camera to subject distance by means of a variable resistor in cooperative association with focusing means as more fully described in U.S. Pat. No. 3,611,895 entitled "Photographic Camera For Use In Daylight and Artificial Light" issued Oct. 12, 1971. This patent discloses a photographic camera wherein the aperture size is determined both as a function of scene brightness and of the position of the focusing means when the exposure is made in artificial light.

All of the above-described exposure control systems, however, have one thing in common which is that they are designed for use with exposure apparatus having distinct mechanisms for determining exposure aperture and exposure interval, so that the aperture is determined prior to the actual commencement of the exposure interval. However, most recently, so-called "scanning type" shutter blade mechanisms have been found to be most advantageous. "Scanning type" shutter blade mechanisms generally embody two shutter blade elements formed with respective selectively shaped aperture openings therethrough which, depending upon the position of the blades, symmetrically overlap over a light entering exposure opening within the camera to define an effective scene light admitting aperture. Such blades, during an exposure interval, will move simultaneously and in correspondence with each other to define a symmetrically configured and progressively variable effective aperture opening over the camera light entering opening. Such "scanning type" shutter blade systems have been utilized in conjunction with automatic exposure control systems to automatically terminate exposure interval as well as with "follow focus" systems of the above-described type. Such shutter blade mechanisms have also included a driving solenoid which may be energized at a select current level to control the rate at which the shutter blade elements move thereby defining the rate of change of the effective scene light admitting aperture as is more fully described in a copending application for U.S. Pat. Ser. No. 350,025 by C. Petersen filed Apr. 11, 1973, in common assignment herewith. However, even these exposure control arrangements may not provide the requisite flexibility to achieve a particular exposure program.

Therefore, it is a primary object of this invention to provide an automatic exposure control system for use in conjunction with "scanning type" shutter blade elements wherein the maximum effective aperture to which the shutter blade elements progress during an exposure interval is an inverse function of scene brightness.

It is also an object of this invention to provide an automatic exposure control system for use in conjunction with "scanning type" shutter blade elements wherein the maximum effective aperture to which the shutter blade elements progress during an exposure interval is determined in accordance with a first select scene brightness after which the shutter blade elements are returned to their closed position to terminate the exposure interval in accordance with a second select scene brightness.

It is a further object of this invention to provide an automatic exposure control system for use in conjunction with "scanning type" shutter blade elements wherein the progressive movement of the shutter blade elements are automatically arrested in accordance with a select scene light.

It is an even further object of this invention to provide an automatic exposure control system for use in conjunction with "scanning type" shutter blade elements wherein the maximum effective aperture to which the shutter blade elements are allowed to progress is programmed inversely to scene brightness so that high levels of scene light intensity result in relatively small effective apertures while low levels of scene light intensity result in substantially larger effective apertures.

Other objects of the invention will in part be obvious and will in part appear hereinafter.

SUMMARY OF THE INVENTION

This invention relates to a photographic camera apparatus comprising a housing including means within the housing for receiving a source of electrical energy together with means for defining a film exposure plane. The photographic apparatus additionally includes a blade assembly together with means for mounting and moving the blade assembly through selective displacement from an initial closed arrangement wherein the blade assembly precludes scene light from impinging on the exposure plane to an open arrangement wherein the blade assembly permits scene light to impinge on the exposure plane and then to a final closed arrangement wherein the blade assembly again precludes scene light from impinging on the exposure plane. Such a displacement of the blade assembly serves to define an exposure interval. There are also included scene light detecting means for providing an output signal in correspondence to scene light detected subsequent to the displacement of the blade assembly while defining an exposure interval. Means are additionally provided for actuating the mounting and moving means to initiate displacement of the blade assembly from its initial closed arrangement towards its open arrangement in order to being the exposure interval. Means are further provided for actuating the mounting and moving means subsequent to the initial displacement to stop the blade assembly in an arrangment allowing a select scene light to impinge on the film exposure plane in response to the output signal of the scene light detecting means reaching a first predetermined value. Means thereafter actuate the mounting and moving means to initiate the displacement of the blade assembly into its final closed arrangement in response to the output signal of the light detecting means reaching a second predetermined value greater than the first predetermined value.

Instead of the above-described means for actuating the mounting and moving means to stop the blade assembly and thereafter initiate the displacement of the blade assembly into its final closed arrangement, there may be provided means for actuating the mounting and moving means, subsequent to the initial displacement, to stop the blade assembly in an arrangement allowing a select scene light to impinge on the film exposure plane in response to the initial appearance of a select output signal from the detector means. The actuating means would thereafter operate in response to the select output signal from the detector means to change the corresponding relationship between the output signal from the scene light detecting means and the detected scene light thereby temporarily removing the select output signal from the detecting means. The select output signal from the detector means would thereafter reappear so as to cause the actuating means to respond by actuating the mounting and moving means to initiate the displacement of the blade assembly back to its final closed arrangement.

The mounting and moving means may include a solenoid comprising an excitation winding through which an axis may be defined together with a stationary armature concentrically disposed with respect to the winding axis and forming a part of a flux path. The armature has an inside end face configured to define a first guide surface concentric with respect to the winding axis. A plunger is also disposed within the winding for limited axial translation along the winding axis and includes an inside end face configured to define a second guide surface in cooperative association with the first guide surface so as to accommodate axial translation of the second guide surface along the winding axis while at the same time permitting limited radial displacement of the second guide surface and its associated plunger end face with respect to the winding axis. The radial displacement ultimately is limited by lateral engagement between the first and second guide members. The solenoid includes means for establishing the continuity of the flux path at the winding together with guide means in slidable engagement with respect to the plunger at a location spaced apart from the plunger end face and second guide surface for restricting radial displacement of the plunger with respect to the winding axis. At the same time, the guide means accommodates axial translation of the plunger along the winding axis in a manner whereby a select partial energization of the winding operates to urge the second guide member to radially displace into lateral engagement with respect to the first guide member thereby stopping the axial translation of the plunger regardless of the plunger position. Full energization of the winding thereafter operates to urge the plunger end face to translate toward the armature end face to retract the plunger.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment or when read in connection with the accompanying drawings wherein like members have been employed in the different figures to note the same parts and wherein:

FIG. 3 is a schematic diagram for one embodiment of the exposure control circuit of this invention;

FIG. 4 is a graphical representation of various signal levels at various points in the circuit of FIG. 3;

DESCRIPTION OF THE PREFERRED EMBODIMENT

Figure 1:
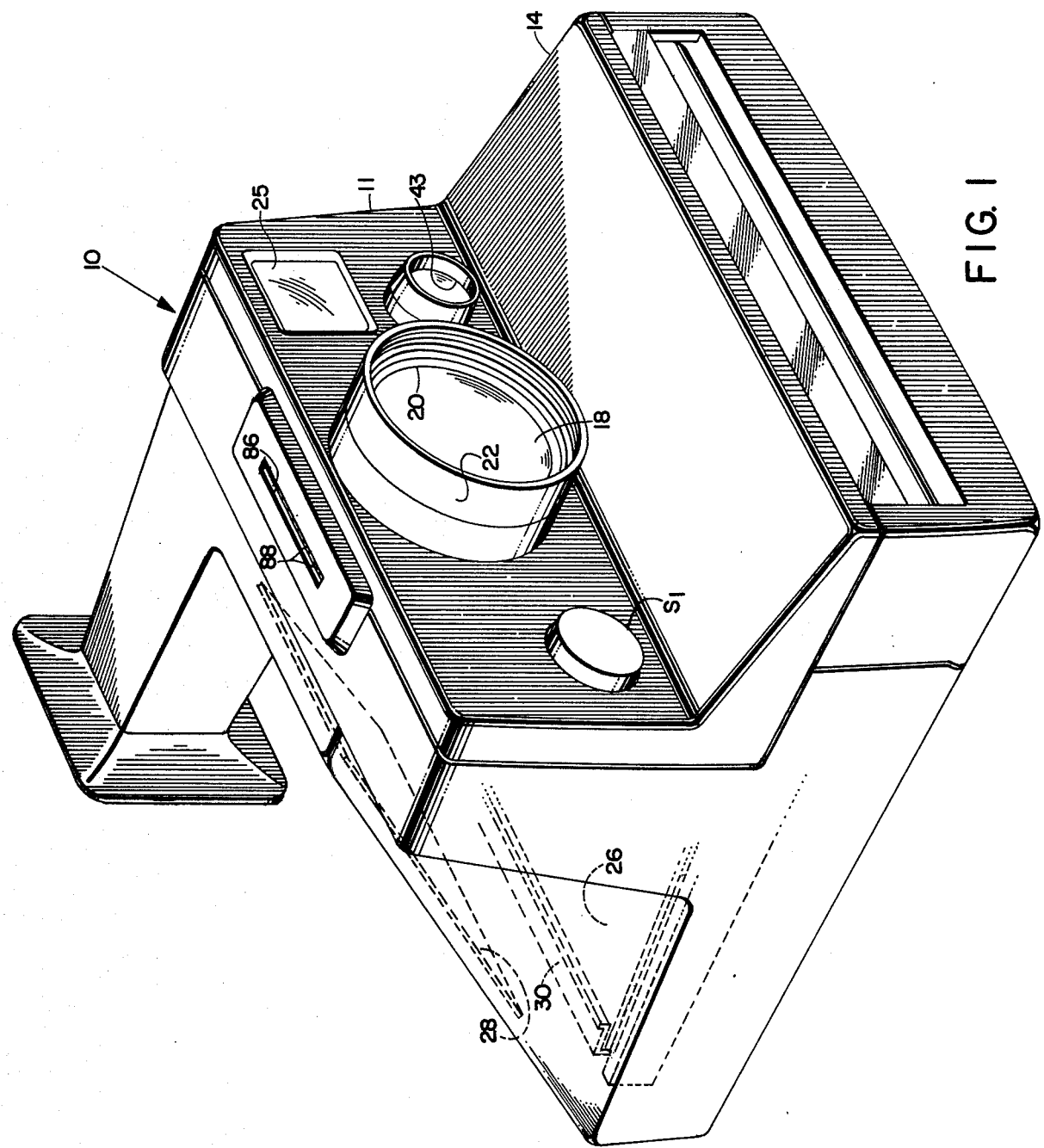
FIG. 1 is a perspective view of a photographic apparatus embodying the exposure control system of this invention.
Figure 2:
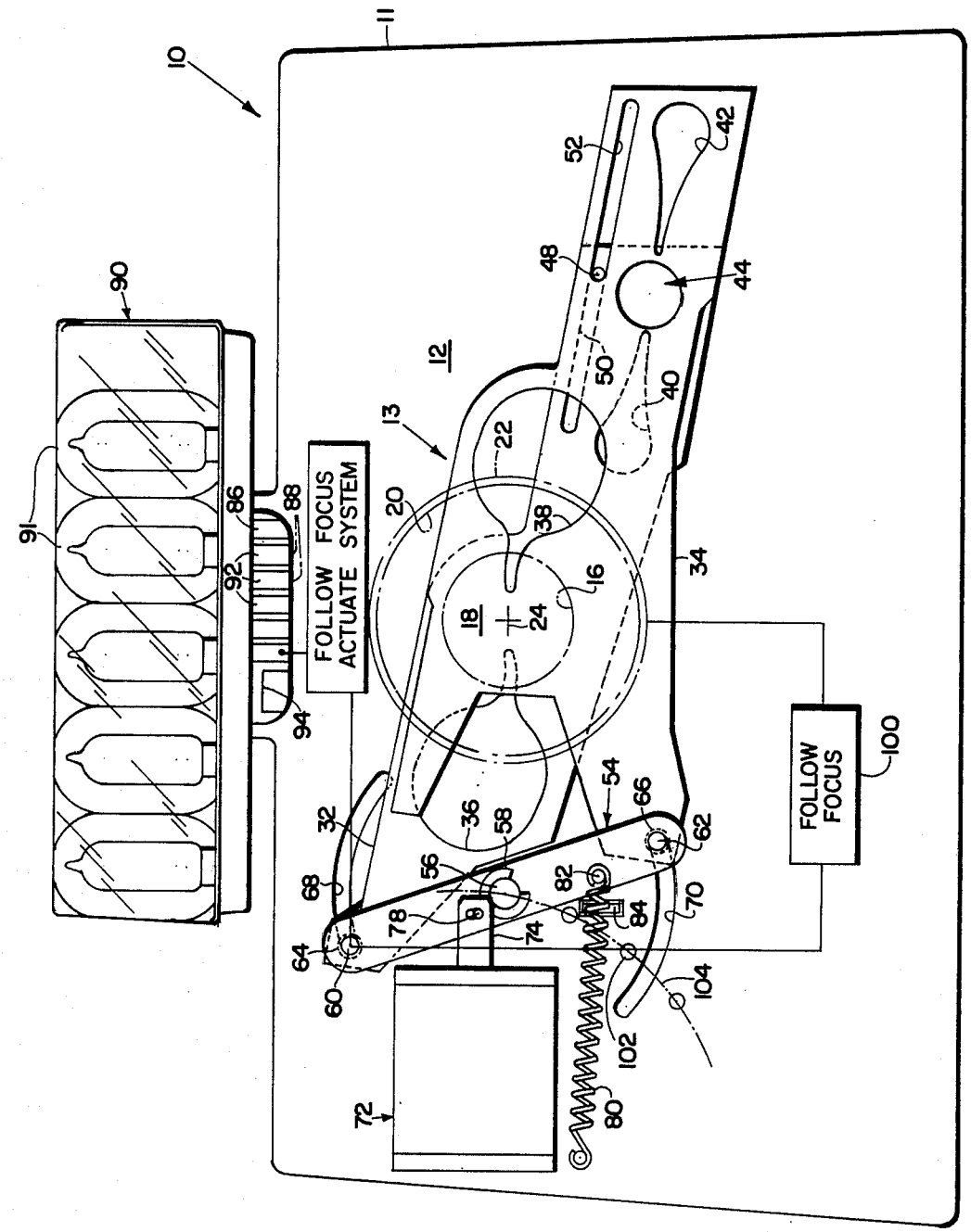
FIG. 2 is a front cutaway view of the exposure control mechanism of the photographic apparatus of FIG. 1.

Referring now to FIGS. 1 and 2, it can be seen that the exposure control system of this invention is associated with a photographic camera apparatus 10 contained within a housing 11. A baseblock casting 12 is fixedly stationed within the housing 11 and selectively machined to support the various components of an exposure mechanism shown generally at 13. Surrounding the front and top of the baseblock casting 12, there is provided a cover section 14 which includes at least one opening through which extends a manually adjustable focus bezel 22. Centrally disposed within the baseblock casting 12, there is provided a light entering exposure opening 16 which defines the maximum available exposure aperture for the system.

An objective or taking lens 18 is provided in overlying relation to the light entering opening 16 wherein the objective lens 18 may comprise a plurality of elements retained in predetermined spaced relation by a cylindrical lens mount 20 which is externally threaded for toothed engagement within the internally threaded focus bezel 22. As is readily apparent, focus bezel 22 is made rotatable with respect to the front cover 14 to provide translational movement of the elements of lens 18 along the center axis 24 of the optical path of the housing 11. As is readily apparent, the central optical axis 24 is illustrated in FIG. 2 as being normal to the plane of the drawing. Thus, rotation of the focus bezel 22 may be carried out by manual rotation to provide displacement of the elements of objective lens 18 for focusing of image carrying rays through the light entering exposure opening 16 to a rearwardly positioned film plane 26 by way of a reflecting mirror 28 all of which are stationed within a suitable light tight film exposure chamber 30 within the housing 11.

Intermediate the objective lens 18 and light entering exposure opening 16, there are supported two overlapping shutter blade elements 32 and 34 of the so called "scanning type" which will be subsequently described in greater detail herein. Extending from the front cover 14 there is provided a photographic cycle initiating button $S_1$, the depression of which commences the exposure interval by effecting the release of the shutter blade elements 32 and 34. In addition, there is provided a viewfinder shown generally at 25 which enables a photographer to properly frame the desired scene to be photographed.

A pair of scene light admitting primary apertures 36 and 38 are provided respectively in the blade elements 32 and 34 to collectively define a progressive variation of effective aperture openings in accordance with simultaneous longitudinal and lateral displacement of one blade element with respect to the other blade element in a manner as is fully described in a U.S. patent application Ser. No. 585,128 entitled "Camera With Pivoting Blades" by George D. Whiteside, filed July 2, 1974, and assigned in common herewith. The apertures 36 and 38 are selectively shaped so as to overlap the light entering exposure opening 16 thereby defining a gradually varying effective aperture size as a function of the position of the blade elements 32 and 34.

Each of the blades, 32 and 34, may additionally be configured to have corresponding photocell sweep secondary apertures shown respectively at 40 and 42. Secondary apertures 40 and 42 may be configured in correspondence with the shapes of scene light admitting primary apertures 32 and 34. As is readily apparent, the secondary apertures 40 and 42 also move in correspondence with the primary apertures 36 and 38 to define a small secondary effective aperture for admitting the passage of scene light transmitted through a second opening 43 in the cover 14 from the scene being photographed. Scene light admitted by the photocell secondary apertures 40 and 42 is thereafter directed to a light detecting station shown generally at 44. The light detecting station includes a photoresponsive element 46 which cooperates with the light integrating and control circuitry (to be subsequently described) to terminate an exposure interval as a function of the amount of light received through the secondary effective aperture defined by the overlapping photocell sweep apertures 40 and 42.

Projecting from the baseblock casting 12 at a location spaced laterally apart from the light entering exposure opening 16, is a pivot pin or stud 48 which pivotally and translatively engages elongate slots 50 and 52 formed in respective shutter blade elements 32 and 34. Pin 48 may be integrally formed with the baseblock casting 12 and blade elements 32 and 34 may be retained in engaging relation with respect to the pin 48 by any suitable means such as peening over the outside end of pin 48.

The opposite ends of the blade elements 32 and 34 respectively include extended portions which pivotally connect to a walking beam 54. Beam 54, in turn, is disposed for rotation relative to the baseblock casting 12 by pivotal connection to a projecting pivot pin or stud 56 which may be integrally formed with the baseblock casting 12 at a location spaced laterally apart from the light entering exposure opening 16. The walking beam 54 may be pivotally retained with respect to the pin 56 by conventional means such as an E ring 58. In the preferred mode, the walking beam 54 is pivotally connected at its distal ends to the shutter blade elements 32 and 34 by respective pin members 60 and 62 which extend laterally outward from the walking beam 54. Pin members 60 and 62 are preferably circular in cross section and extend through respective circular openings 64 and 66 in respective blade elements 32 and 34 so as to slidably engage respective arcuate slots or tracks 68 and 70 which may be integrally formed within the baseblock casting 12. The arcuate tracks 68 and 70 operate to inhibit disengagement of the blade elements 32 and 34 from their respective pin members 60 and 62 during operation of the exposure control system.

A tractive electromagnetic device in the form of a solenoid 72 is employed to displace the shutter blades 32 and 34 with respect to each other and the casting 12. The solenoid 72 is of special design, as described in a copending application for U.S. patent Ser. No. 619,361, filed Oct. 3, 1975 by J. Muggli filed concurrently herewith having an internally disposed cylindrical plunger unit 74 which retracts inwardly into the body of the solenoid upon energization of a solenoid winding 76. The solenoid plunger 74 may be affixed to the walking beam 54 by means of a pivot pin or stud 78 such that longitudinal displacement of the plunger 74 will operate to rotate the walking beam around the pivot pin 56 so as to appropriately displace the shutter blades 32 and 34.

The baseblock casting 12 supports the solenoid 72 in a position above a biasing tension spring 80 which operates to continuously urge the blade elements 32 and 34 into positions defining their largest effective aperture over the light entry exposure opening 16. The movable end of spring 80 is attached to walking beam 54 by a pin 82 while the stationery end of spring 80 is grounded with respect to the baseblock casting 12. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIG. 2 when the solenoid 72 is energized. Consequently, energization of solenoid 72 prevents the shutter blades 32, 34 from moving towards their maximum aperture opening under the urging of spring 80. However, as should be readily understood, the exposure control system of this invention would be equally applicable to photographic systems where the blades 32 and 34 are spring biased in a normally closed position.

Continued energization of the solenoid 72 in order to maintain the shutter blade elements 32 and 34 in their closed positions may result in an undesirable drain in the camera apparatus power source which preferably is an electrical storage battery schematically shown in FIGS. 3, 5, 6, and 7 at 96. Thus, a mechanical latch as shown generally at 84 may be provided to move into lateral engagement with an edge of the walking beam 54 so as to maintain the blade elements 32 and 34 in their closed position regardless of the energization of solenoid 72. Additional information regarding the structure and operation of the latch 84 is described in an application for U.S. patent, Ser. No. 554,777 entitled "Photographic Apparatus with Sequencing System" by B. K. Johnson, D. Van Allen and G. D. Whiteside, filed Mar. 3, 1975 in common assignment herewith.

The photographic camera apparatus 10 may be utilized in conjunction with a source of artifical illumination which preferably comprises a linear array of flashlamps as shown generally at 90. The linear flash array includes a plurality of individually spaced apart flashlamps 91 which respectively connect to a plurality of spaced apart terminal pads or elements 92. The linear flash array 90 may be releasably connected with respect to the camera housing 11 by way of a receiving socket 86 which also includes a plurality of spaced apart terminal pads or elements 88. The linear flash array 90 may be inserted and withdrawn from the receiving socket 86 in a manner as is fully described in U.S. Pat. No. 3,757,643 entitled "Photoflash Apparatus" by John Burgarella issued Sept. 11, 1973 and assigned in common herewith.

Under conditions of artificial illumination wherein the light has a relatively short duration such as from the individual flashlamps 91 of the linear array 90, the anticipated light level at the camera will depend upon the known characteristics of the flashlamps 91 and upon the distance from the subject being photographed to the light source. When the flash array 90 is mounted on the receiving socket 86, there may be actuated a follow focus system whereby the maximum effective aperture to which the shutter blade elements 32, 34 are allowed to progress is determined in accordance with the distance from the taking lens 18 to the subject being photographed. Thus, as the focus bezel 22 is rotated to provide the correct focus for a particular distance from the photographic apparatus 10 to the subject, a follow focus mechanism (shown generally at 100) moves to appropriately displace a follow focus interceptor pin 102 about its locus of travel as shown by the phantom line 104. The follow focus interceptor pin 102 may be selectively actuated to intercept the edge of walking beam 54 in a well known manner as is more fully described in a U.S. patent application Ser. No. 554,777 entitled "Exposure Control System With Improved Follow Focus Capability For Photographic Apparatus", by George D. Whiteside, filed Feb. 28, 1975, and assigned in common herewith. Thus, as is readily apparent, the walking beam 54 may be intercepted by the follow focus interceptor pin 102 at various locations defining various maximum effective apertures which correspond to the distance from which the subject is spaced from the camera apparatus 10.

Turning now to FIG. 3, there is shown generally at 106 one embodiment of the exposure control circuitry of this invention which includes a light detecting and integrating circuit 108 comprising the photoresponsive element 46 in series connection with respect to a light integrating capacitor 114 and an anticipation resistor 116. The light detecting and integrating circuit 108 is energized by way of a power supply line 110 and a return ground line 112. The photoresponsive element 46 may be of the well known photoresistor type so as to cooperate with the light integrating capacitor 114 to provide an output signal at line 118 indicative of the time integration of the detected scene light.

The output signal from the light detecting and integrating circuit 108 at line 118 is thereafter directed to a pair of level detector circuits 124, 126 by way of interconnecting lines 120 and 122 respectively. Each level detector 124 and 126 may be of any conventional design such as a Schmidt trigger. As is readily apparent, the steady state input reference voltage to the level detector 124 is established by biasing means comprising a first resistor 128 connected between the supply line 110 and the input line 120' together with a second resistor 130 connected between the input line 120' and the ground line 112. In like manner, the steady state reference input voltage level to the detector 126 is established by biasing means comprising a third resistor 132 connected between the supply line 110 and the input line 122' together with a fourth resistor 134 connected between the input line 122' and the ground line 112. The output signal from the detector 124 is directed to the base of an NPN transistor 138 by way of an interconnecting line 136. The collector of transistor 138, in turn, is connected to the supply line 110 by way of the solenoid winding 76, while the emitter of transistor 138 is connected to the ground line 112. In like manner, the output signal from the level detector 126 is directed to the base of an NPN transistor 144 by way of an interconnecting line 142. The collector of transistor 144, in turn, is connected to the supply line 110 by way of the solenoid winding 76 and an interconnecting resistor 145, while the emitter of transistor 144 is in common connection with the emitter of transistor 138 and the ground line 112.

A photographic exposure cycle may be commenced in ordinary ambient light upon the depression of the exposure cycle initiating button $S_1$. As will become readily apparent, the operational sequence for the various embodiments of the exposure control system for this invention are described in relation to a photographic camera of the non-single lens reflex type, although the intended scope of the invention is by no means so limited and cameras of the well-known reflex type as described in U.S. Pat. No. 3,672,281 entitled "Reflex Camera" by E. H. Land may be equally suitable for embodying the exposure control system of this invention. Closure of the switch $S_1$ operates to simultaneously move the latch 84 out of engagement with the edge of the walking beam 54 in a manner fully described in U.S. patent application Ser. No. 554,777 supra, as well as to energize the exposure control circuit 106. Disengagement of the latch 84 from the edge of the walking beam 54 permits the tension spring 80 to rotate the walking beam 54 in a clockwise direction as viewed in FIG. 2. In this manner, the shutter blade elements 32 and 34 are moved in directions which operate to progressively enlarge the effective aperture over the light entering exposure opening 16 as graphically shown by the aperture area vs. time curve of FIG. 4. Rotation of the walking beam 54 effects simultaneous linear and angular movement of the shutter blade elements 32 and 34 about pivot pin 48 so that photocell sweep secondary apertures 40 and 42 simultaneously define a corresponding progressively enlarging aperture opening over the photoresponsive element 46.

As is readily apparent, the battery supply voltage across line 110, 112 will be maintained only as long as the operator maintains switch $S_1$ in its depressed state which may be perfectly adequate for situations where the human reaction time in depressing and releasing the switch $S_1$ substantially exceeds the longest exposure time likely to be incurred. However, in situations where the normal exposure time is likely to exceed the human reaction time in depressing and releasing switch $S_1$, there may be provided a latch circuit 154 in parallel connection with respect to the switch $S_1$ for maintaining continuous energization of the circuit 106 even after the release of the switch $S_1$. A suitable automatic latch circuit is more fully described in U.S. Pat. No. 3,744,385 entitled "Control System For Photographic Apparatus" by Burgarella et. al. issued July 10, 1973, and assigned in common herewith.

From the instant the photographic exposure cycle is initiated by the depression of the switch $S_1$, the photoresponsive element 46 provides a time varying resistance output response corresponding to the intensity of scene light incident thereon. The capacitor 114 operates in conjunction with the photoresponsive element 46 to provide an output signal A which is representative of the time integration of the scene light intensity incident to the photoresponsive element 46, as best seen by the curve A vs. time in FIG. 4.

The input voltage level A to the detector circuit 126 is initially below the reference level established by the resistors 132 and 134 and thereafter increases toward the reference level to trigger the level detector 126. When the level detector 126 is triggered, the output signal therefrom at line 142 abruptly changes from a generally low value which is insufficient to maintain the transistor 144 in conduction, to a substantially higher current level of sufficient value to turn on the transistor 144 and thus establish a current flow from collector to emitter through the transistor 144. After the initiation of the photographic exposure cycle, the voltage level at line 122 gradually increases as a result of the time integration of the scene light incident to the photoresponsive element 46, until reaching the predetermined reference value required to trigger the level detector circuit 126, thereby abruptly changing the output response at line 142 to turn on transistor 144. Turning on transistor 144 results in a current flow through the collector emitter junctions thereof, as well as through the resistor 145, so as to partially energize the solenoid winding 76 and generate a magnetic force opposing the opening spring force. In this manner outward movement of the solenoid plunger 74 is effectively slowed down and stopped as will be more fully described in the following discussion. Braking the solenoid 72 in this manner so as to stop the movement of plunger 74 also operates to simultaneously stop the movement of the shutter blade elements 32 and 34 in a position defining a select maximum effective aperture over the light entering exposure opening 16. Thus, the shutter blade elements 32 and 34 may be halted during the actual exposure interval to define a maximum effective aperture which is programmed inversely with scene brightness. High levels of scene light intensity therefore result in relatively small maximum apertures while, conversely, low levels of scene light intensity result in relatively large maximum effective apertures.

The steady-state reference voltage level to the level detector 124 is biased by the resistors 128 and 130 to be above the predetermined value required to trigger the level detector 126. In like manner, triggering the level detector 124 also results in an abrupt change in the output current level at line 136 from a generally low value of an insufficient value to turn on the transistor 138, to a substantially higher current level of sufficient value to turn on the transistor 138 at time $T_2$ as best seen in FIG. 4 by the curve C vs. time. Thus, after the solenoid winding 76 is energized to brake the plunger 74 and arrest the movement of shutter blade elements 32 and 34 at time $T_1$, the light detecting and integrating circuit 108 continues to provide an output signal at line 118 representative of the time integration of the scene light intensity incident to the photoresponsive element 46. The voltage level at line 120 progressively increases as a result of the time integration of the scene light incident to the photoresponsive element 46 until it reaches the predetermined value required to trigger the level detector 124, thereby turning on the transistor 138 so as to fully energize the solenoid winding 76 and cause the solenoid plunger 74 to retract thereinto at time $T_2$. Retraction of the solenoid plunger 74, in turn, operates to rotate the walking beam 54 in a counterclockwise direction as viewed from FIG. 2 against the biasing force of tension spring 80 so as to move the shutter blade elements into their light blocking closed position. After the walking beam 54 is rotated to its full counterclockwise position, the latch 84 may be automatically moved into intercepting relation with the edge of the walking beam so as to permit the deenergization of the solenoid in a manner as more fully described in U.S. patent application Ser. No. 554,777, supra.

Referring now to FIG. 4, it can be readily appreciated that an exposure program may be selected for use in conjunction with the two-bladed "scanning type" exposure mechanism herein described that will provide satisfactory exposures under a wide variety of scene lighting conditions. This is made possible by the fact that not only may the exposure interval be terminated as a function of scene brightness, but also the maximum effective aperture to which the shutter blade elements are allowed to progressively increase, may also be determined as a function of scene light intensity.

Under conditions of low ambient light intensity, it may be necessary in order to provide an adequate film exposure to insert the linear flash array 90 into the flash array receiving socket 86 in a manner causing respective electrical contact between terminal pads or elements 92 and 88. Insertion of the linear flash array 90 within the flash array receiving socket 86 may also operate to actuate the follow focus mechanism 100 so as to move the interceptor pin 102 into the walking beam 54 locus of travel. As previously discussed, the rotation of the focus bezel 22 to focus the objective lens 18 also operates to move the interceptor pin 102 along the phantom line 104. Thus, the maximum effective aperture to which the shutter blade elements 32, 34 may be progressively opened would be limited by the point of interception of the pin 102 with the edge of the walking beam 54.

However, in camera arrangements where a mechanical follow focus arrangement of the above-described type may prove impractical, it may nevertheless still be desirable to limit the maximum effective aperture to which the shutter blade elements progressively increase as a function of the subject to camera distance. Towards this end, there may be provided a timing circuit shown generally at 149 which comprises a variable resistor or potentiometer 150 in series connection with respect to a timing capacitor 152. The movable part or slider of the variable resistor 150, as shown at 151, is mechanically coupled to the schematically indicated focus bezel 22, which as previously discussed may be rotated between positions indicative of the distances between the camera and subject. Capacitor 152 of the timing circuit 149 is also connected to a terminal pad 88'' by way of a line 158 for reasons which will become apparent from the following discussion. Immediately adjacent terminal pad 88'', there is provided another terminal pad 88' which is connected to input line 122 by way of a line 156. Two adjacent terminal pads 92', 92'' in the linear flash array 90 are electrically coupled by means of an interconnecting electrically conductive shorting element 94 so that insertion of the linear flash array 90 within the receiving socket 86 operates to bring the terminal pads 92', 92'' into respective electrical contact with the terminal pads 88', 88''. The electrically conductive shorting element 94 thus operates to connect one side of the timing capacitor 152 to line 122 by way of the interconnecting lines 156 and 158. The timing circuit 149 is therefore automatically coupled to the exposure control circuit 106 upon the insertion of the linear flash array 90 into the flash receiving socket 86. The remaining terminals 88 are shown to connect respectively by way of lines 153 to a flash sequencing circuit 148 of a type shown and described in U.S. Pat. No. 3,618,492.

The flash mode of operation is also commenced with the depression of the switch $S_1$ which, in turn, operates to move the latch 84 out of engagement with the edge of walking beam 54, thus permitting the tension spring 80 to rotate the walking beam 54 in a clockwise direction to move the shutter blade elements 32 and 34 in directions which operate to progressively enlarge the effective aperture over the light entering exposure opening 16. The depression of switch $S_1$ also simultaneously operates to initiate energization of the timing circuit 149 whereupon the capacitor 152 begins to charge at a rate determined by the slider 151 positioned in accordance with objective lens focusing. The output signal level at line 122 will now increase regardless of the low ambient light intensity until it reaches the predetermined value required to trigger the level detector 126 thereby abruptly changing the output response B at line 142. The transistor 144 is thus turned on to partially energize winding 76 so as to brake the solenoid plunger 74 and arrest the position of the shutter blade elements. It should now be readily apparent that the timing circuit 149, being responsive to objective lens focusing, operates in the manner of the previously described follow focus system to set the exposure aperture in accordance with the anticipated light level at the scene to be photographed. Thus, the follow focus mechanism 100 and its associated interceptor pin 102 may be entirely replaced by the timing circuit 149 with its variable resistor 150 which is adjusted in concert with objective lens focusing.

Once the solenoid winding 76 is partially energized to brake the plunger 74 and arrest the motion of the shutter blade elements, the flash sequencing circuit 148 may operate to energize an appropriate flashlamp 91 as is more fully described in an application for U.S. patent Ser. No. 619,384, filed Oct. 10, 1975 entitled "Exposure Control System With Fill Flash Race Condition" by Edwin K. Shenk, filed concurrently herewith. In this manner other exposure influencing parameters, such as the illumination from the flashlamps 91, may be controlled by the solenoid braking signal. Energization of the appropriate flashlamp 91 may be expected to provide sufficient illumination to dramatically increase the signal output level at line 118 from the light detecting and integrating circuit 108. Generally, the artificial illumination will be of sufficient intensity to increase the signal level at line 120 until it reaches the predetermined value required to trigger the level detector 124 thereby abruptly changing the output response at line 136 so as to turn on the transistor 138 and fully energize solenoid winding 76. Upon full energization of solenoid winding 76 plunger 74 retracts into the winding 76 so as to close the blade elements 32 and 34 and thereby terminate the exposure interval.

Figure 5:
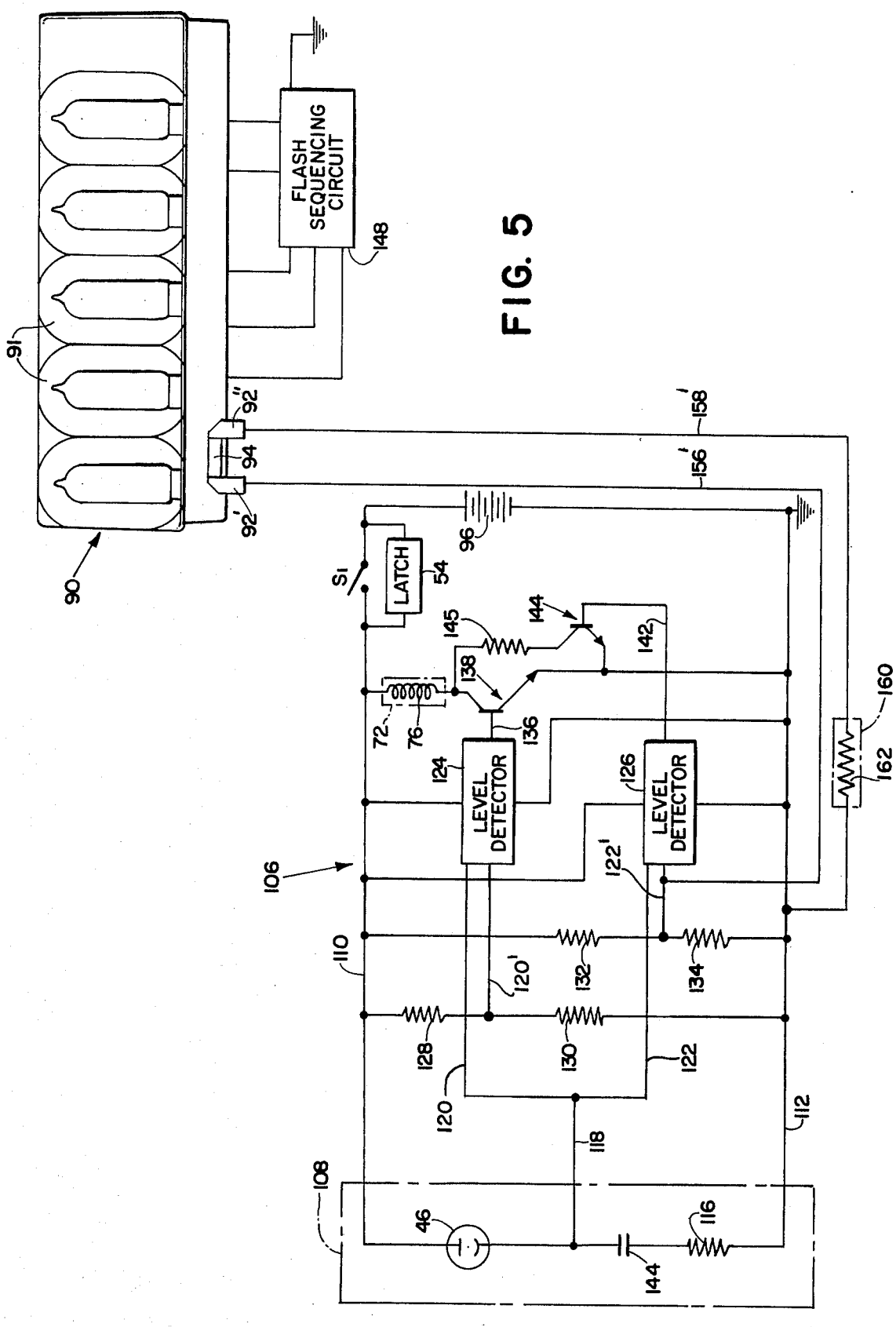
FIG. 5 is a schematic diagram for an alternate embodiment of the exposure control circuit of FIG. 3.

Referring now to FIG. 5 where like numerals designate previously described elements, there can be seen an alternate arrangement whereby the timing circuit 149 is removed and means for decreasing the steady state reference level to the level detector 126 are included as shown at 160. The reference level decreasing means 160 automatically respond to the insertion of the linear flash array 90 into the receiving socket 86, and may comprise simply a resistor 162, one side of which is in direct connection to the ground line 110 and the other side of which connects to the terminal path 92'' by way of an interconnecting line 158'. Thus, insertion of the linear flash array 90 within the receiving socket 86 operates to electrically interconnect the lines 156', 158' so as to connect the other side of the biasing resistor 162 to line 122' thereby decreasing the steady state voltage reference level at line 122'. As is readily apparent, decreasing the steady state reference voltage level to the level detector 126 reduces the overall change required in the output signal from the light detecting and integrating means 108 at line 118 to reach the predetermined trigger level of detector 126. Thus, low ambient light intensity levels may still be sufficient to effect the requisite change in the signal level of line 118 to trigger the level detector 126 and thereby partially energize the solenoid winding 76 to brake the solenoid plunger 74. Thus, by selectively altering the steady state input voltage bias level to the detector 126, the exposure control circuit 106 can be made to operate in substantially the same mode in both high and low levels of ambient scene light intensity.

Figure 6:
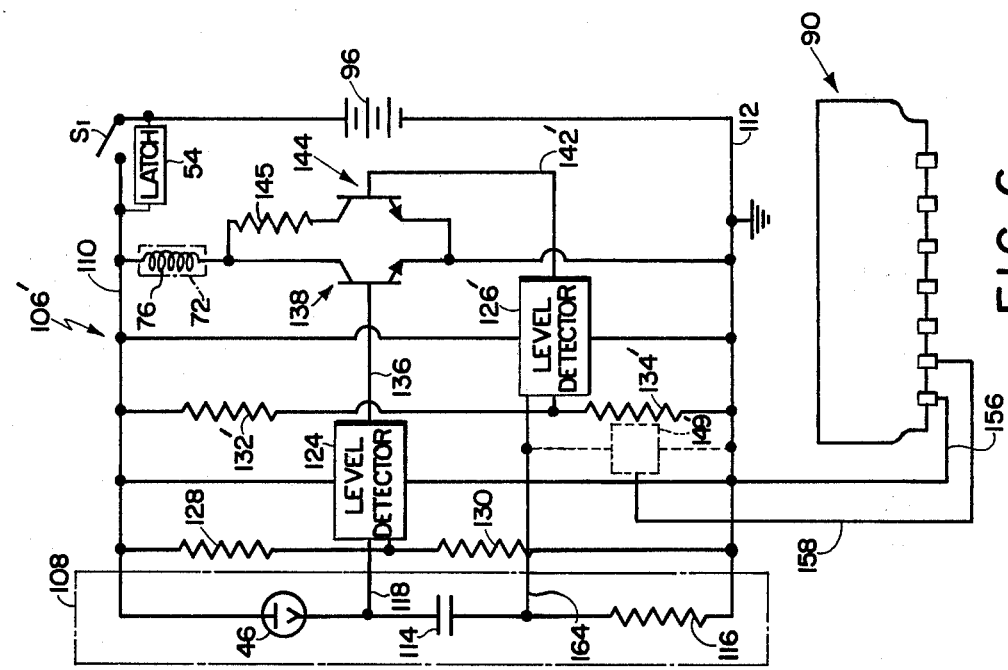
FIG. 6 is a schematic diagram for another alternate embodiment of the exposure control circuit of FIG. 3.

Referring now to FIG. 6 where like numerals designate previously described elements, there is shown another arrangement at 106' for the exposure control circuits of FIGS. 3 and 5. Level detector 126', however, instead of being made responsive to an output signal representative of the time integration of the scene light intensity incident to the photoresponsive element 46 as was previously described, is now made responsive to an output signal representative of the actual scene light intensity incident to the photoresponsive element 46. The input to the level detector 126' is therefore connected directly to the junction between the light integrating capacitor 114 and the anticipation resistor 116 by way of a line 164 so as to be directly responsive to a predetermined level of scene light intensity. Bias resistors 132' and 134' are appropriately selected to provide a steady state reference input voltage level which is compatible with a select change in the output signal level at line 164 corresponding to a select change in scene light intensity for triggering the level detector 126'. Braking the solenoid 72 to arrest the shutter blade elements 32 and 34 as a function of incident scene light intensity, instead of the time integration of scene light intensity, may be necessary to meet the particular requirements of a select exposure program. In addition, as is readily apparent, the timing circuit 149 of FIG. 3 may also be included in the circuit of FIG. 6 as shown at 149', and made automatically operative in response to the insertion of the linear flash array 90 within the receiving socket 86 in the above-described manner.

Figure 7:
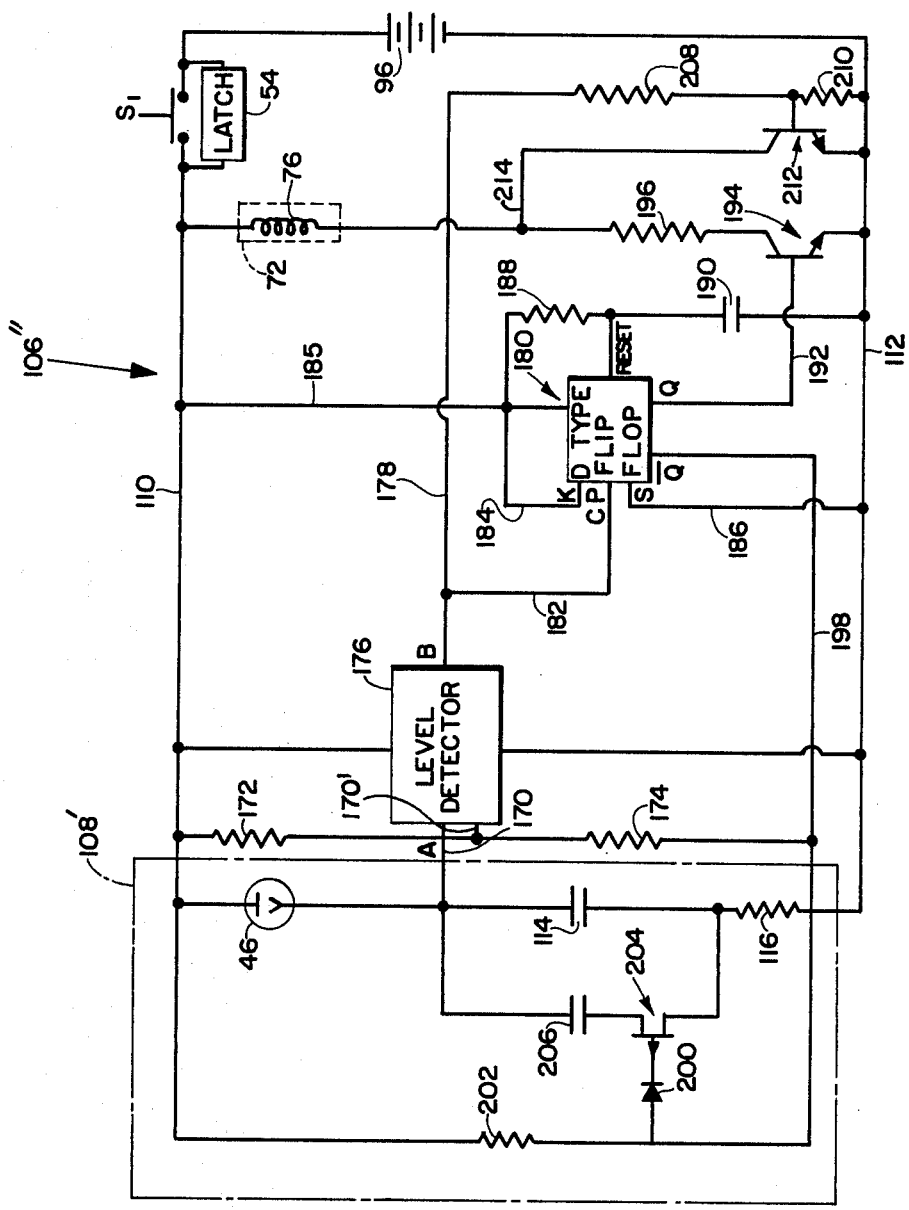
FIG. 7 is a schematic diagram of still another alternate embodiment for the exposure control circuit of FIG. 3.

Turning now to FIG. 7, there is shown still another embodiment for the exposure control circuitry of this invention where like numerals again reference above-described elements. The exposure control circuit includes a light detecting and integrating circuit 108' including the light responsive element 46 in series connection with the light integrating capacitor 114 and the anticipation resistor 116. In parallel connection with respect to the light integrating capacitor 114, there is provided a second light integrating capacitor 206 together with a field effect transistor 204, whereupon the source of the field effect transistor 204 connects to the junction between the capacitor 114 and resistor 116. The gate of the field effect transistor 204 connects to the cathode of a diode 200 while the anode of the diode 200 connects to the supply line 110 by way of the resistor 202.

The output signal from the light detecting and integrating circuit 108' is directed to a level detector 176 by way of an interconnecting line 170. A steady state input reference voltage level to the detector 176 is established by biasing means comprising a first resistor 172 connected between supply line 110 and input line 170' together with a second resistor 174 connected between input line 170' and ground line 112. The output signal from the level detector 176 is directed to the base electrode of an NPN transistor 212 by way of an interconnecting line 178 and a resistor 208. The emitter of transistor 212, in turn, is directly grounded while the base is grounded by way of a resistor 210. The collector of transistor 212 is connected in series relation with respect to the solenoid winding 76 by way of a line 214.

The output signal from the level detector 176 is also directed to the control pulse input terminal of a binary circuit 180 by way of an interconnecting line 182. The binary circuit 180 is preferably a D type flip-flop wherein the S input terminal is grounded by way of a line 186 and the K input terminal is connected to the supply line 110 by way of the interconnecting lines 184 and 185. The reset input terminal to the binary circuit 180 is connected to the power supply line 110 by way of a resistor 188. A capacitor 190 connects the reset input terminal of the binary circuit 180 to ground. The Q output terminal of the binary circuit 180 connects to the base of an NPN transistor 194 by way of an interconnecting line 192. The emitter of transistor 194 is grounded while the collector connects to the solenoid winding 76 by way of an interconnecting resistor 196. The $\overline{Q}$ output terminal for the binary circuit 180 in turn is connected to the anode of diode 200 by way of a line 198.

A photographic exposure cycle is again commenced upon the depression of the switch $S_1$ which simultaneously energizes the exposure control circuit 106'' while also operating to move the latch 84 out of engagement with the walking beam 54 so as to allow the tension spring 80 to rotate the walking beam 54 in a clockwise direction as viewed in FIG. 2. As previously described, the shutter blade elements 32 and 34 then move in directions which operate to progressively enlarge the effective aperture over the light entering exposure opening 16 as graphically shown in FIG. 8 by the aperture vs. time curve. Simultaneously, photocell sweep secondary apertures 40 and 42 define a corresponding progressively enlarging aperture opening over the photoresponsive element 46 which provides a variable resistance response corresponding to the scene light intensity incident thereon. The light detecting and integrating circuit 108' then provides an output representative of the time integration of the scene light intensity incident to the photoresponsive element 46. The steady-state input reference voltage level to the detector 176 established by the biasing resistors 172 and 174 determines the predetermined value to which the signal level at line 170 must progress in order to trigger the level detector 176. During the photographic exposure cycle, the signal level at line 170 progressively increases as a result of the time integration of the scene light incident to the photoresponsive element 46 until it reaches the predetermined value required to trigger the level detector 176 at time $T_1$ as shown by the Graph A vs. time in FIG. 8. Triggering level detector 176 causes an abrupt change to the signal level at lines 178 and 182 in the manner shown in the Graph B vs. time of FIG. 8.

Figure 8:
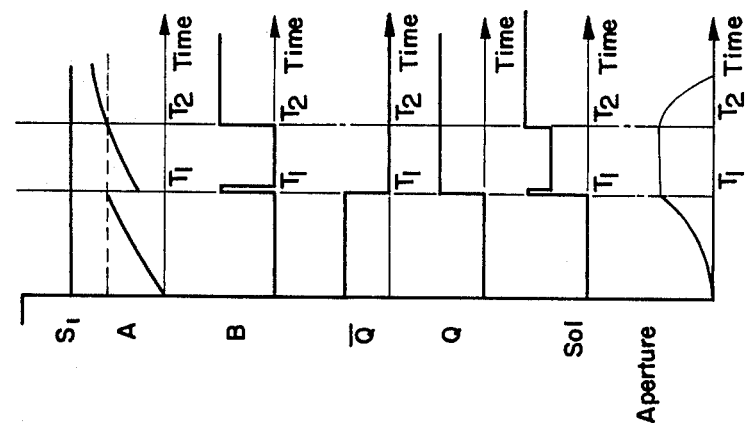
FIG. 8 is a diagram for various signal levels at various points in the schematic circuit of FIG. 7.

The instantaneous rise in the output signal level at line 182 operates to pulse the binary circuit 180 so as to abruptly change the output signal levels at the terminals $\overline{Q}$ and Q as shown respectively in the Graphs $\overline{Q}$ vs. time and Q vs. time of FIG. 8. The decrease in the output signal level at the $\overline{Q}$ operates by way of the line 198 and diode 200 to forward bias the field effect transistor 204 effectively switching the capacitor 206 into parallel relation with respect to the capacitor 114. The sudden switching of capacitor 206 into parallel relation with the capacitor 114 operates to cause a sudden drop in the output signal level at line 170 from the light detecting and integrating circuit 108'' as shown at time $T_1$ in the Graph A vs. time of FIG. 8. In this manner, the level detector 176 is returned to its initial low output signal level at line 178.

In addition, the change in the output signal level at the Q terminal of the binary circuit 180 operates to turn on transistor 194 so as to establish a collector current through the resistor 196 and consequently through the solenoid winding 76. The resistor 196 is selected to limit the collector current through transistor 194 thereby effecting only a partial energization of the solenoid winding 76 so as to brake the solenoid plunger 74 and arrest the progressive movement of the shutter blade elements 32 and 34 at time $T_1$. As should be readily apparent by referring to the Graph B vs. time of FIG. 8, the initial triggering of the level detector 176 results in only a momentary high signal level at line 178 which is of insufficient duration to turn on transistor 212 for a sufficient time to cause the solenoid plunger 74 to retract.

Continued integration of the scene light incident to the photoresponsive element 46 results in a recovery of the output signal level from the light detecting and integrating circuit 108' at line 170 which may be best seen from the graph A vs. time in FIG. 8. Once again, the signal level at line 170 reaches the predetermined value required to trigger the level detector circuit 176 thereby abruptly changing the output response at line 178 as shown at time $T_2$ in the Graph B vs. time. The high signal level at line 178 in turn operates to turn on transistor 212 so as to fully energize the solenoid winding 76 at time $T_2$, thereby retracting the plunging unit 74 and closing the blade elements 32 and 34 to terminate the exposure interval. In this manner, the exposure interval is terminated when an appropriate amount of light is received by the photoresponsive element 46. It will be readily appreciated that the increased signal level on line 182 occurring at time $T_2$ does not effect the output signal from the binary circuit 180 at terminals $\overline{Q}$ and Q which were previously switched by the output pulse occurring at time $T_1$. The binary circuit 180 is automatically reset upon the initiation of a subsequent exposure interval by the capacitor 190 which operates to initially ground the reset terminal of the binary circuit 180. Thus, a single level detector may be used to first brake the solenoid 72 and arrest the progressive forward movement of the shutter blade elements 32 and 34 upon a first predetermined exposure value corresponding to a select time integration of the scene light incident to the photoresponsive element 46, and to thereafter fully energize the solenoid to retract the shutter blade elements to their closed position as a function of a second predetermined exposure value corresponding to a second select time integration of the scene light incident to the photoresponsive element 46.

Figure 9:
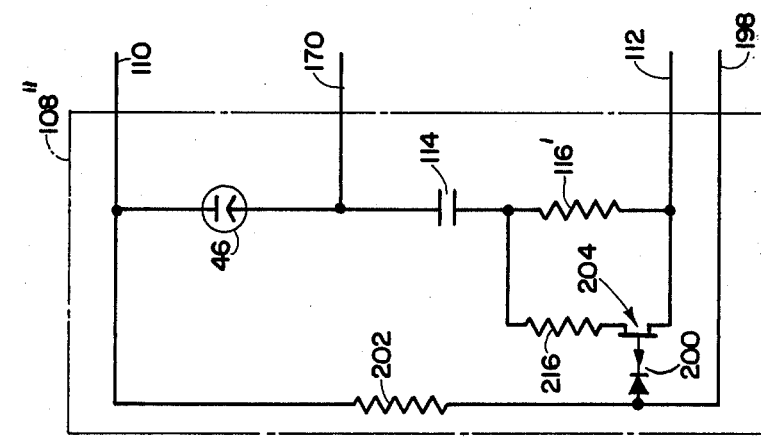
FIG. 9 is a schematic diagram for an alternate embodiment of a portion of the circuit of FIG. 7.

Referring now to FIG. 9, where like numerals designate previously described elements, there is shown an alternate arrangement at 108'' for the light integrating and detecting circuit 108' of FIG. 7. A second resistor 216 is connected in series relation with respect to the field effect transistor 204, both of which are connected in parallel relation with respect to the resistor 116'. Thus, the first switching of the level detector 176 to brake the solenoid 72 and arrest the forward progressive movement of the shutter blade elements 32 and 34 also operates to forward bias the field effect transistor 204 thereby decreasing the effective resistance of resistor 116' while simultaneously dropping the voltage level at line 170. In this manner the rate of time integration of the scene light incident to the photovoltaic cell 46 remains substantially constant throughout the exposure interval, and does not abruptly change subsequent to the arresting of the shutter blade elements as would happen for the control circuit of FIG. 7.

Figure 10:
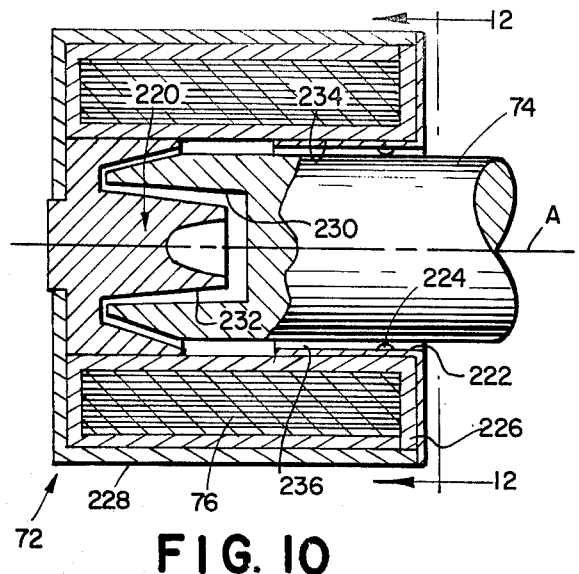
FIG. 10 is a cross-sectional view of a portion of a solenoid utilized in conjunction with the exposure control system of this invention.
Figure 12:
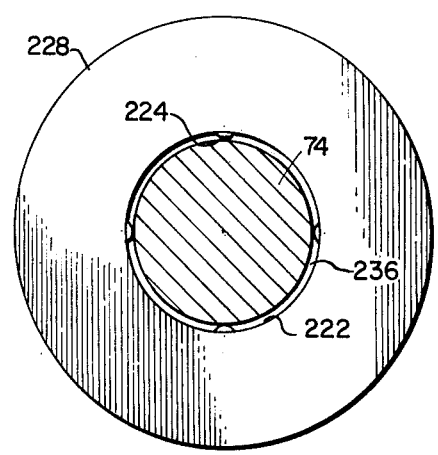
FIG. 12 is a cross-sectional view taken across the lines 12—12 of FIG. 10.
Figure 11:
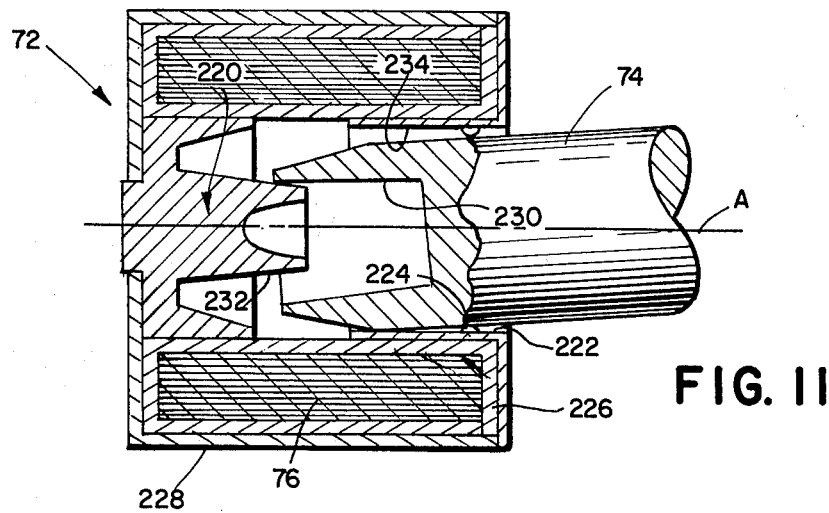
FIG. 11 is a cross-sectional side view of a portion of the solenoid of FIG. 10 in a different operative mode.

Referring now to FIGS. 10–12, there is shown in substantial detail the solenoid 72 which is particularly suited for arresting motion of the shutter blade elements 32 and 34 upon a partial energization of the solenoid winding 76. Solenoid 72 is also described and claimed in a copending application for U.S. patent Ser. No. 619,361, filed Oct. 10, 1975 by J. Muggli filed concurrently herewith in common assignment. The excitation winding 76 is spirally wound about an elongated insulator supporting bobbin 226 which in turn is positioned within a U-shaped frame 228 for fixed connection with respect to the baseblock casting 12. Plunger 74 is cylindrically shaped and disposed in general concentric relation with respect to an axis A symmetrically disposed within the internal hollow core 234 of the elongated winding 76. There is also provided a stationary armature or plug 220 centrally disposed within the internal hollow core 234 of bobbin 226. The inside end face of armature 220 defines a conical frustum surface 232 which extends loosely into a cylindrical recess 230 in the inside end face of plunger 74 in order to guide the plunger 74 in a manner which will become more apparent from the following discussion.

A cylindrically shaped ferro-magnetic flux tube 222 is stationed in fixed concentric relation with respect to the bobbin 226 and in circumferentially spaced apart relation with respect to the plunger 74 so as to define an annular air gap 236 between the plunger 74 and tube 222. The end of the plunger 74 is supported in spaced apart relation with respect to the magnetic flux tube 222 by the cooperative guiding arrangement between the conical frustum 232 and the recess 230. Closely adjacent the outside end of the tube 222, there are provided a plurality of circumferentially spaced apart projections or nipples 224 which extend radially inward from the tube 222 into slidable engaging relation with respect to the plunger 74 so as to establish a fulcrum upon which the plunger may be selectively pivoted in the following manner.

Solenoid 72 is designed to have a force-stroke characteristic for matching operation in conjunction with the associated spring force of biasing tension spring 80. Accordingly, when the solenoid 72 is in the unenerigized state, the bias exerted by tension spring 80 operates to progressively move the shutter blade elements 32, 34 in the direction of ever-increasing aperture. However, when excitation winding 76 is partially energized in the aforementioned manner, the conical frustum 232 of armature 220 defines a magnetic flux condition which saturates that portion of the plunger recess 230 closest thereto so as to pull the plunger 76 against the armature 220 during the braking mode of operation. In this manner, the plunger 74 is pivoted about the fulcrum defined by the nipples 224 so as to assume the eccentric position as shown in FIG. 11, and thereby provide a frictional holding force during braking. As is readily apparent, the tube 222 and nipples 224 operate to guide the plunger 74 through axial translation while also accommodating lateral displacement of the inside end face of the plunger 74.

When the control circuitry determines that a proper exposure has been made in the above described manner, winding 76 of solenoid 72 is fully energized to cause the retraction of plunger 74 into the seated position as shown in FIG. 10. During plunger retraction, the stationary armature 220 cooperates with the recess 230 to guide the plunger 74 into a generally concentric position with respect to the axis A. However, as will be readily appreciated, the major diametal extent of the conical frustum 232 is preferably slightly less than the diameter of the recess 230 so as to only loosely fit therein upon full plunger retraction. Whereas the recess 230 is illustrated as being cylindrical in shape, it should be readily appreciated that the recess may also define a frusto-conical interior surface complementary to the stationary armature frustum 232.

Figure 13:
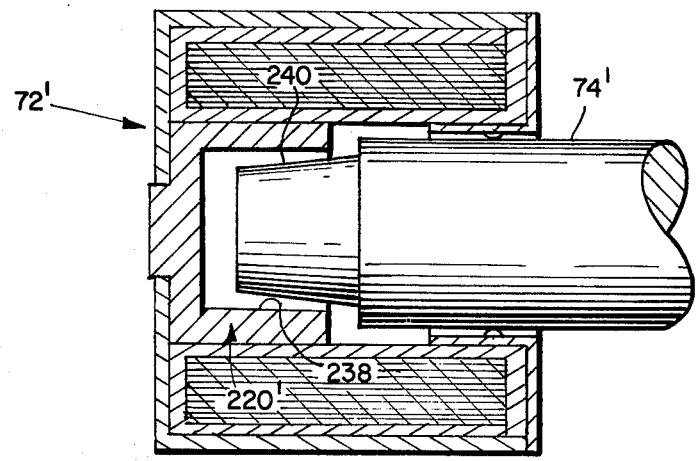
FIG. 13 is a cross-sectional view of a portion of an alternate embodiment for the solenoid of FIG. 10.

Referring now to FIG. 13, there is shown an alternate arrangement at 72' for the solenoid of FIG. 10. The inside end face of the plunger 74' defines a projecting conical frustum 240 disposed for slidable engagement with respect to a cylindrical recess 238 in the armature 220'. Again the solenoid 72 is braked upon partial energization thereof by the magnetic flux saturation across the closest points between the conical frustum 240 and the cylindrical recess 238. Thus the plunger 74' is also laterally displaced in the above-described manner to brake the forward momentum thereof and arrest the movement of the shutter blade elements 32 and 34.

Since certain changes may be made in the above-described embodiments without departing from the scope of the invention herein involved, it is intended that all matter contained in the above description or shown in the accompanying drawings shall be interpreted as illustrative and not in a limiting sense.

What is claimed is:

1. A photographic camera comprising:
   a housing;
   an objective lens mounted on said housing;
   means within said housing for receiving a source of electrical energy;
   means within said housing for defining a film exposure plane;
   a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;
   scene light detecting means energizable by the source of electrical energy for providing an output signal in correspondence to the amount of scene light detected subsequent to the commencement of an exposure interval; and
   means, at least in part energizable by the source of electrical energy, for intiating the displacement of said blade assembly from its said initial closed arrangement towards its said second arrangement thereby commencing a particular exposure program defined by a plurality of exposure parameters and then, responsive to said output signal of said scene light detecting means reaching a first predetermined value, for effecting the displacement of said blade assembly into its said final closed arrangement, and, responsive to said output signal of said scene light detecting means reaching a second predetermined value less than said first predetermined value prior to said blade assembly reaching its said second arrangement, for effecting a modification of a characteristic of a given exposure parameter associated with said particular exposure program from the character said given exposure parameter assumes in situations wherein said blade assembly arrives at its said second arrangement before said output signal of said scene light detecting means reaches its said second predetermined value.

2. The photographic camera of claim 1 wherein said blade assembly includes two shutter blade elements having respective primary and secondary apertures therethrough wherein the primary apertures during shutter blade displacement cooperatively define a first effective aperture for admitting scene light to said film exposure plane and wherein the secondary apertures move in correspondence with the primary apertures and cooperatively define a second effective aperture for admitting scene light to said scene light detecting means.

3. The photographic camera of claim 1 wherein said blade assembly includes two shutter blade elements having respective primary and secondary apertures therethrough wherein the primary apertures during shutter blade displacement cooperatively define a first effective aperture for admitting scene light to said film exposure plane and wherein the secondary apertures move in correspondence with the primary apertures and cooperatively define a second affective aperture for admitting scene light to said scene light detecting means.

4. A photographic camera comprising:
a housing;
an objective lens mounted on said housing;
means within said housing for receiving a source of electrical energy;
means within said housing for defining a film exposure plane;
a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane, said blade assembly being configured to define progressively increasing apertures through which scene light may impinge upon said exposure plane as it moves from its said initial arrangement towards it said second arrangement and to define progressively decreasing apertures through which scene light may impinge upon said exposure plane as it moves from its said second arrangement to its said final arrangement;
scene light detecting means energizable by the source of electrical energy for providing an output signal in correspondence to the amount of scene light detected subsequent to the commencement of an exposure interval; and
means, at least in part energizable by the source of electrical energy, for initiating the displacement of said blade assembly from it said initial closed arrangement towards its said second arrangement thereby commencing a particular exposure program for terminating the displacement of said blade assembly towards it said second arrangement at an arrrangement intermediate its said initial arrangement and its said second arrangement responsive to said output signal of said scene light detecting means reaching a first predetermined value prior to said blade assembly's reaching its said second arrangement thereby establishing a select one of said progressively increasing apertures in operative relationship with said exposure plane under such a condition, and then, responsive to said output signal of said scene light detecting means reaching a second predetermined value greater than said first predetermined value, for effecting a final displacement of said blade assembly, from the one of said arrangements said blade assembly is in at the time said output signal reaches its said second predetermined value, to its said final closed arrangement thereby terminating said particular exposure program, said final displacement of said blade assembly serving to define progressively decreasing apertures in operative relationship with respect to said exposure plane.

5. The photographic camera of claim 4 wherein: said scene light detecting means include means for integrating the detected scene light subsequent to said initial displacement of said blade assembly such that said output signal corresponds to said integrated scene light;
said means for terminating the displacement of said blade assembly include a first level detector having input and output terminals by which said output signal from said integrating means may be applied thereto and a second output signal respectively derived therefrom for actuating said blade assembly to establish said select one of said progressively increasing apertures wherein the output signal from said first level detector abruptly changes in response to the output signal from said integrating means reaching said first predetermined value; and
said means for effecting said final displacement of said blade assembly into its said final closed arrangement include a second level detector having input and output terminals by which said output signal from said integrating means may be applied thereto and a third output signal derived therefrom for actuating said blade assembly to effect said final displacement wherein the output signal from said second level detector abruptly changes in response to the output signal from said integrating means reaching said second predetermined value.

6. The photographic camera of claim 5 wherein said means for terminating the displacement of said blade assembly include circuit means for establishing an input reference level to said first level detector input terminal coincident with said first predetermined value so that a select change in the output signal of said integrating means corresponds to the difference between said first predetermined value and the input signal to said first level detector initially established by said integrating means, and additionally including means automatically responsive to electrically coupling a source of artificial illumination to said circuit means for altering the input reference level to said first level detector thereby also changing the value of said select change required in the output signal of said integrating means to achieve said altered reference level.

7. The photographic camera of claim 5 wherein said means for terminating the displacement of said blade assembly include circuit means for establishing an input reference level to said first level detector input means coincident with said first predetermined value so that a select change in the output signal of said integrating means corresponds to the difference between said first predetermined value and the input signal level to said level detector initially established by said integrating means, and additionally including means automatically responsive to electrically coupling a source of artificial illumination to said circuit means for providing a time variable input level to said first level detector whereupon the time variable input level will reach the predetermined value subsequent to the initiation of the exposure interval regardless of the change in the output signal of said integrating means.

8. The photographic camera of claim 7 including an objective lens together with means for focusing said objective lens wherein said means for providing a time variable input includes means for adjusting the rate at which the input varies as a function of lens focusing.

9. The photographic camera of claim 4 wherein: said scene light detecting means provides a first output signal generally corresponding to the intensity of detected scene light and also include means for integrating the detected scene light subsequent to said initial displacement of said blade assembly to provide a second output signal corresponding to said integrated scene light;

said means for terminating the displacement of said blade assembly include a first level detector having input and output terminals by which the first output signal from said detecting means may be applied thereto and a third output signal respectively derived therefrom for actuating said blade assembly to establish said select one of said progressively increasing apertures wherein the output signal from said first level detector abruptly changes in response to the first output signal of said detecting means reaching said first predetermined value; and said means for effecting said final displacement of said blade assembly into its said final closed arrangement includes a second level detector having input and output terminals by which the second output signal from said integrating means may be applied thereto and a fourth output signal respectively derived therefrom for actuating said blade assembly to effect said final displacement wherein the output signal from said second level detector abruptly changes in response to the second output signal from said integrating means reaching said second predetermined value.

10. The photographic camera of claim 9 wherein said means for terminating the displacement of said blade assembly include circuit means for establishing an input reference level to said first level detector input means coincident with said first predetermined value so that a select change in said first output signal of said detecting means corresponds to the difference between said first predetermined value and the input signal level to said first level detector initially established by said integrating means, and additionally including means automatically responsive to electrically coupling a source of artificial illumination to said circuit means for altering the input reference level to said first level detector thereby also changing the value of said select change required in the first output signal of said detecting means to achieve said predetermined value.

11. The photographic camera of claim 9 wherein said means for terminating the displacement of said blade assembly include circuit means for establishing an input reference level to said first level detector input terminal coincident with said first predetermined value so that a select change in the first output signal of said detecting means corresponds to the difference between said first predetermined value and the input signal level to said level detector initially established by said integrating means, and additionally including means automatically responsive to electrically coupling a source of artificial illumination to said circuit means for providing a time variable input level to said first level detector whereupon the time variable input level will reach the first predetermined value subsequent to the initiation of the exposure interval regardless of the change in detected scene light intensity.

12. The photographic camera of claim 11 including an objective lens together with means for focusing said objective lens wherein said means for providing a time variable input includes means for adjusting the rate at which the input varies as a function of lens focusing.

13. The photographic camera of claim 4 wherein said blade assembly includes a solenoid for terminating the displacement thereof as well as effecting said final displacement thereof, said solenoid comprising:

an elongated excitation winding defining a longitudinal axis around which said excitation winding is disposed, along which said excitation winding extends, and with respect to which said excitation winding is radially spaced;

means for cooperating with said excitation winding, when said excitation winding is energized, for establishing a substantially low reluctance flux path for the electromagnetic field of said excitation winding, said flux path establishing means including a stationary armature positioned adjacent one end of said excitation winding and extending intermediate portions of said excitation winding disposed on opposite sides of said longitudinal axis to define a first surface positioned within said excitation winding intermediate said excitation winding and said axis, and an elongated plunger disposed generally along said axis and having an end portion extending between radially disposed portions of said excitation winding, said end portion of said plunger defining a second surface disposed in facing relationship with respect to said first surface of said armature, at least one of said surfaces constituting a guide surface extending generally lengthwise of said axis and canted with respect thereto and against which said other surface is adapted to be slidably seated;

means, spaced from said first surface lengthwise of said axis and extending radially inwardly from said excitation winding into contact with the longitudinal extending peripheral surface of said plunger, for establishing a fulcrum upon which said plunger can pivot to selectively effect engagement between said first and second surfaces; and means for urging said plunger outwardly of said excitation winding in the direction away from its said one end, said surfaces further being configured and arranged such that, when said excitation winding is energized at a first predetermined level, contact is effected between said guide surfaces under a force sufficient to establish frictional forces therebetween precluding further displacement of said plunger in either direction along said axis and, when said excitation winding is subsequently energized at a second predetermined level greater than said first predetermined level, the frictional forces thereby established between said first and second surfaces and the force exerted on said plunger by said plunger urging means are insufficient to preclude further displacement of said plunger inwardly of said excitation winding towards its said one end under the influence of said electromagnetic field.

14. A photographic camera comprising:

a housing;

an objective lens mounted on said housing;

means within said housing for receiving a source of electrical energy;

means within said housing for defining a film exposure plane;

a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;

scene light detecting means energizable by the source of electrical energy for providing an output signal in correspondence to the amount of scene light detected subsequent to the commencement of an exposure interval; and means, at least in part energizable by the source of electrical energy, for initiating the displacement of said blade assembly from its said initial closed arrangement towards its said second arrangement thereby commencing a particular exposure program defined by a plurality of exposure parameters and then, responsive to said output signal of said scene light detecting means initially reaching a predetermined value, for effecting a modification of a characteristic of a given exposure parameter associated with said particular exposure program from the character said given exposure parameter assumes in situations wherein said blade assembly arrives at its said second arrangement before said output signal of said scene light detecting means reaches said predetermined value and also operating in response to said output signal of said scene light detecting means initially reaching said predetermined value to change the corresponding relationship between said scene light detecting means output signal and the detected scene light thereby changing the value of said output signal to a value different from said predetermined value, and thereafter being responsive to said output signal from said detector means again reaching said predetermined value for effecting the displacement of said blade assembly into its said final closed arrangement.

15. The photographic camera of claim 14 wherein said blade assembly includes two shutter blade elements having respective primary and secondary apertures therethrough wherein the primary apertures during shutter blade displacement cooperatively define a first effective aperture for admitting scene light to said film exposure plane and wherein the secondary apertures move in correspondence with the primary apertures and cooperatively define a second effective aperture for admitting scene light to said scene light detecting means.

16. A photographic camera comprising:
a housing;
an objective lens mounted on said housing;
means within said housing for receiving a source of electrical energy;
means within said housing for defining a film exposure plane;
a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane, said blade assembly being configured to define progressively increasing apertures through which scene light may impinge upon said exposure plane as it moves from its said initial arrangement towards its said second arrangement and to define progressively decreasing apertures through which scene light may impinge upon said exposure plane as it moves from its said second arrangement to its said final arrangement;

scene light detecting means energizable by the source of electrical energy for providing an output signal in correspondence to the amount of scene light detected subsequent to the commencement of an exposure interval; and means, at least in part energizable by the source of electrical energy, for initiating the displacement of said blade assembly from its said initial closed arrangement towards its said second arrangement thereby commencing a particular exposure program, for terminating the displacement of said blade assembly towards its said second arrangement at an arrangement intermediate its said initial arrangement and its said second arrangement responsive to said output signal of said scene light detecting means initially reaching a predetermined value prior to said blade assembly reaching its said second arrangement thereby establishing a select one of said progressively increasing apertures in operative relationship with said exposure plane under such a condition and also operating in response to said output signal of said scene light detecting means initially reaching said predetermined value to change the corresponding relationship between said scene light detecting means output signal and the detected scene light thereby changing the value of said output signal to a value different from said predetermined level, and thereafter being responsive to said output signal of said scene light detecting means again reaching said predetermined value, for effecting a final displacement of said blade assembly, from the one of said arrangements said blade assembly is in at the time said output signal initially reaches its said predetermined value, to its said final closed arrangement thereby terminating said particular exposure program, said final displacement of said blade assembly serving to define progressively decreasing apertures in operative relationship with respect to said exposure plane.

17. The photographic camera of claim 16 wherein said means for terminating the displacement of said blade assembly includes a binary circuit of the type having two separate output signals each of which exists in either of two stable states wherein both of said binary output signals change state in response to said initial appearance of said select output signal from said detector means and thereby respectively operate to control the termination of displacement of said blade assembly in the arrangement intermediate its said initial arrangement and its said second arrangement and the changing of the corresponding relationship between said scene light detecting means output signal and the detected scene light.

18. The photographic camera of claim 17 wherein said scene light detecting means includes means for integrating the detected scene light subsequent to said initial displacement of said blade assembly such that the output signal therefrom corresponds to said integrated scene light and wherein said means for changing the corresponding relation between said scene light detecting means output signal and the detected scene light includes switch means in parallel relation with respect to said light integrating means, said switch means being responsive to the change in state of one of said binary output signals from said binary circuit for changing the corresponding relationship between said scene light detecting means output signal and the detected scene light.

19. The photographic camera of claim 18 wherein said light integrating means includes a first capacitor together with a second capacitor connected in series relation with said switch means, said second capacitor and switch means also being connected in parallel relation with respect to said first capacitor.

20. The photographic camera of claim 18 wherein said light integrating means includes a capacitor connected in series relation with respectt to a first resistor together with a second resistor connected in series relation with said switch means, said second resistor and switch means also being connected in parallel relation with respect to said first resistor.

21. The photographic camera of claim 16 wherein said blade assembly includes a solenoid comprising:

an elongated excitation winding defining a longitudinal axis around which said excitation winding is disposed, along which said excitation winding extends, and ith respect to which said excitation winding is radially spaced;

means for cooperating with said excitation winding, when said excitation winding is energized, for establishing a substantially low reluctance flux path for the electromagnetic field of said excitation winding, said flux path establishing means including a stationary armature positioned adjacent one end of said excitation winding and extending intermediate portions of said excitation winding disposed on opposite sides of said longitudinal axis to define a first surface positioned within said excitation winding intermediate said excitation winding and said axis, and an elongated plunger disposed generally along said axis and having an end portion extending between radially disposed portions of said excitation winding, said end portion of said plunger defining a second surface disposed in facing relationship with respect to said first surface of said armature, at least one of said surfaces constituting a guide surface extending generally lengthwise of said axis and canted with respect thereto and against which said other surface is adapted to be slidably seated;

means, spaced from said first surface lengthwise of said axis and extending radially inwardly from said excitation winding into contact with the longitudinal extending peripheral surface of said plunger, for establishing a fulcrum upon which said plunger can pivot to selectively effect engagement between said first and second surfaces; and means for urging said plunger outwardly of said excitation winding in the direction away from its said one end, said surfaces further being configured and arranged such that, when said excitation winding is energized at a first predetermined level, contact is effected between said guide surfaces under a force sufficient to establish frictional forces therebetween precluding further displacement of said plunger in either direction along said axis and, when said excitation winding is subsequently energized at a second predetermined level greater than said first predetermined level, the frictional forces thereby established between said first and second surfaces and the force exerted on said plunger by said plunger urging means are insufficient to preclude further displacement of said plunger inwardly of said excitation winding towards its said one end under the influence of said electromagnetic field.

22. The photographic camera of claim 16 wherein said blade assembly includes two shutter blade elements having respective primary and secondary apertures therethrough wherein the primary apertures during shutter blade displacement cooperatively define a first effective aperture for admitting scene light to said exposure plane and wherein the secondary apertures move in correspondence with the primary apertures and cooperatively define a second effective aperture for admitting scene light to said detecting means.

* * * * *